United States Patent
Johnstone et al.

(10) Patent No.: US 10,257,147 B2
(45) Date of Patent: **\*Apr. 9, 2019**

(54) ENHANCED MANAGEMENT OF MIGRATION AND ARCHIVING OPERATIONS

(71) Applicant: QUEST SOFTWARE INC., Aliso Viejo, CA (US)

(72) Inventors: Curtis T. Johnstone, Ottawa (CA); Tomas Willis, Madison, WI (US)

(73) Assignee: QUEST SOFTWARE INC., Alisa Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/812,908

(22) Filed: Nov. 14, 2017

(65) Prior Publication Data

US 2018/0234378 A1 Aug. 16, 2018

Related U.S. Application Data

(63) Continuation of application No. 14/687,732, filed on Apr. 15, 2015, now Pat. No. 9,819,630.

(51) Int. Cl.
| | |
|---|---|
| G06F 15/16 | (2006.01) |
| H04L 12/58 | (2006.01) |
| H04L 29/08 | (2006.01) |
| H04L 29/06 | (2006.01) |

(52) U.S. Cl.
CPC .............. *H04L 51/22* (2013.01); *H04L 51/08* (2013.01); *H04L 67/02* (2013.01); *H04L 67/1097* (2013.01); *H04L 67/42* (2013.01)

(58) Field of Classification Search
CPC ......... H04L 51/22; H04L 51/08; H04L 67/02; H04L 67/1097; H04L 67/42
USPC .................................................. 709/206, 223
See application file for complete search history.

(56) References Cited

U.S. PATENT DOCUMENTS 9,819,630 B2 * 11/2017 Johnstone ............... H04L 51/22

\* cited by examiner

*Primary Examiner* — Philip B Tran
(74) *Attorney, Agent, or Firm* — Maschoff Brennan

(57) ABSTRACT

A network-based solution that provides enhances management of migration and archiving operations may involve, as embodied in various systems, methods, and non-transitory computer-readable storage media, performing a pre-transfer assessment on each of a plurality of accessed mailboxes designated for migration or archiving. Performing the pre-transfer assessment may include designating one or more emails for exclusion from the migration or archiving operation after applying transferability rules and exception rules to each email message contained in the assessed mailbox. The solution may involve notifying the user about the email messages designated for exclusion and performing one or more user selected actions on the email message or related attachment files.

20 Claims, 7 Drawing Sheets

Reply   Reply All   Forward   IM

Fri 9/12/2014 3:17 PM
John Doe
An e-mail with a stub attachment
⟵ 500

To   John_Doe@Example.com

Message   Gone.mh4 [144 KB]
            ⟵ 520

510 ⟶ John,

The attachment has been stubbed. It is a MP4 copy of 'Gone With the Wind'.

Aenean non risus ut justo consectetur placerat. Integer commodo sem odio, eu cursus ex rutrum sit amet. Quisque vitae ultricies eros, sed fermentum mauris. Mauris ac bibendum orci. Proin sodales dui in nisi vehicula vitae non elit. Phasellus vehicula quam ut congue laoreet. Suspendisse potenti.

Etiam vitae orci elit. Fusce luctus varius mauris tristique accumsan. Vivamus porttitor lectus a quam venenatis, sed ultrices felis commodo. Suspendisse potenti. Maecenas non sem pellentesque, facilisis tortor sit amet, consectetur tortor. Proin tempor et neque vitae aliquet. Vivamus eleifend bibendum convallis. Donec a convallis tellus, id ullamcorper tellus. Donec commodo facilisis mi. Maecenas tempor nunc sit amet neque blandit, eget pellentesque risus aliquam. Proin hendrerit augue nisl, sit amet tincidunt turpis interdum vel. Integer quis laoreet ex.

Etiam tincidunt id lorem at ultricies. Sed luctus mauris tortor, at congue diam luctus a. Praesent tristique sapien eu risus auctor hendrerit. Fusce semper fringilla odio eget facilisis. Cras blandit pulvinar urna sit amet fermentum. Aliquam a arcu quis quam auctor blandit vitae sit amet leo. Aliquam elementum aliquam volutpat. In ac sagittis odio, a mollis libero.

Cheers,
John

*FIG. 5*

Gone.mht
Size: 48 KB
Last changed: Fri September 12, 2014

[Message]  Gone.mh4 [48 KB]

Gone With The Wind.MP4

610 — "NOTE: The large file referenced in the above link was migrated to SharePoint Online. If you wish to forward this link or otherwise share the document, permissions must first be set within SharePoint Online to provide the intended recipients access."

*FIG. 6A*

Gone.mht
Size: 144 KB
Last changed: Fri September 12, 2014

[Message]  Gone.mh4 [144 KB]

"GONE WITH THE WIND" — 620

Gone With The Wind.MP4

610 — "NOTE: The large file referenced in the above link was migrated to SharePoint Online. If you wish to forward this link or otherwise share the document, permissions must first be set within SharePoint Online to provide the intended recipients access."

*FIG. 6B*

ENHANCED MANAGEMENT OF MIGRATION AND ARCHIVING OPERATIONS

CROSS-REFERENCE TO RELATED APPLICATIONS

This application is a continuation of U.S. patent application Ser. No. 14/687,732, filed Apr. 15, 2015, titled ENHANCED MANAGEMENT OF MIGRATION AND ARCHIVING, the entirety of which is incorporated herein by reference.

BACKGROUND

Technical Field

The present disclosure concerns migration and archiving operations involving email platforms and other platforms (e.g., enterprise social networking platforms). More particularly, the present disclosure relates to a network-based solution that provides enhanced management of migration and archiving operations.

Background Art

Today, businesses create, deliver, and receive email on an unprecedented level. Many businesses provide each employee with a personalized email account and dedicated mailbox within an enterprise email platform. Some businesses shift toward cloud-based or "hosted" email platforms such as Office 36S™ offered by Microsoft, Inc. (Redmond, Wash.), while others continue to move to newer on-premises email solutions. In either case, migrations between email platforms have become commonplace. And yet, such migrations continue to present a host of problems and difficulties. Given the sheer quantity and size of mailboxes and emails in use today, from small businesses with only a handful of registered email accounts to Fortune 500 companies with tens of thousands of registered accounts, businesses are struggling with the fact that migrating between email platforms can be expensive, time-consuming, tedious, and error-prone.

Although automated email migration solutions like OnDemand Migration for Email™ from Dell Software Inc. (Round Rock, Tex.) have provided businesses with significantly enhanced tools for automatically migrating between email platforms, one problem in particular has persisted in the industry—handling large email attachments. Modern day emails regularly include attachment files such as word processing documents, spreadsheets, or images. In some instances, attachments can carry massive file sizes (e.g., when attempting to send a high-resolution image or a massive data spreadsheet). Architects and other users who routinely send large email messages or attachment files (e.g., CAD files) are particularly susceptible to experiencing these problems. Within the migration context, many hosted email platforms deal with large email attachments by enforcing a predetermined limit on the size of an attachment that may reside in the platform. While businesses face no shortage of options when selecting an email platform, not all platforms enforce the same attachment size limits. Office 365, for example, enforces an email attachment cap of 50 MB. Other email platforms enforce more liberal attachment limits of 70 MB or even 100 MB.

When two email platforms contain different attachment size limits, migrating between them presents a significant problem. Take, for example, the common scenario in which a business decides to migrate to Office 365 after using hypothetical "Source Platform" for many years. The attachment size limit for Source Platform may be 100 MB, while attachment size limit for Office 365 is only 50 MB. Having used Source Platform for many years, the business may have had thousands of its employees, each with their own dedicated mailbox, sending and receiving emails with attachments that were below Source Platform's 100 MB limit but will now violate Office 365's lower 50 MB limit. In this common scenario, the migration process will ultimately fail or—at best—be characterized by poor data fidelity as emails with attachments above 50 MB are lost or migrated without their attachments.

Existing migration solutions face other obstacles as well. In addition to instances in which an email message or attachment file exceeds a predetermined size limit associated with the target email platform, messages or files may contain content that cannot be exported by the source email platform or, conversely, is not supported by the target email platform (e.g., object linking and embedding or "OLE" content). In other cases, problems may arise because a message or file contains encrypted content (e.g., messages residing in an IBM Notes® source platform, which uses a proprietary encryption methodology), corrupted content, or because the message or file resides in a personal archive that is password protected (e.g., a personal storage table or "PST" file). Given these issues, businesses are unable to reliably preserve their data when migrating between certain hosted email platforms. This significant problem has persisted in the industry despite previously attempted solutions.

One inadequate approach is to identify large attachments in the source platform prior to migration and then either delete the attachments or manually move them to an alternative storage platform to avoid causing failures during migration. That approach, however, requires significant manual effort and inevitably results in lost data due to human error or, at a minimum, a broken association between the attachment and the original email message. In some instances, migrating the attachment may require settling for a less than optimal but "best effort" conversion to a file type that the target source platform will support.

Another inadequate approach some have attempted involves reporting. During migration, large attachments are identified and simply logged as errors for any instances in which the migration process fails to successfully transfer an email message or related attachment to the target platform. The reporting method suffers from many of the same limitations as the manual approach described above. At best, the reporting provides businesses with a method of tracking which files they must go back and manually migrate to another location. Notably, many solutions that leverage this approach also fail to offer any guidance on how to preserve data fidelity or maintain the association between the removed attachment and the original email message.

Solutions like AttachThis™ and DropThis™ from Dell Software Inc. have proven useful for reducing the number of attachments maintained in an email platform, but they cannot be applied to automated migration processes. AttachThis and DropThis are add-ins for Microsoft Outlook that automatically upload email attachments to Microsoft SharePoint™, a hosted storage platform, rather than transmit them via email. The add-ins also insert links that direct users to uploaded attachments stored in SharePoint. In addition to being unsuitable for use during migration between email platforms, AttachThis and DropThis require every individual email user to download and install the add-ins on his or her local client. As a result, although they are quite useful for certain applications, the add-ins are difficult to uniformly adopt or implement across an entire enterprise email platform. The same limitations significantly diminish the utility of a similar yet open-sourced mail filtering tool called MIMEDefang. In addition to being unsuitable for automated migration processes, MIMEDefang also lacks the security features and other functionality necessary to make it serviceable on an enterprise-level.

On top of the limitations discussed above, previously attempted solutions also fail to provide any automatic response functionality that equips users with suitable alternative options for acting upon email messages and related attachments that cannot be migrated or archived. Nor do previously attempted solutions provide administrators with the ability to specify a criteria, or set of rules, for messages or files that the business does not want migrated or archived.

Existing migration solutions also provide limited contextual information about migrated email messages, related attachments, or other files that have been modified during the migration process. As a result, users are forced to make an educated guess as to the contents of any given attachment based on limited contextual information such as the file extension or any brief accompanying text. Faced with those restrictions, most users cannot quickly determine whether the content of the attachment is relevant or important. Instead, users must individually open each attachment to assess its relevancy or importance—a process that is not only laborious and inefficient for the user, but is also wasteful of the limited computing resources of the user computing device, the email platform, the hosted storage platform, and the network in general.

In addition to email platforms like those discussed above, other types of platforms, such as enterprise social networking platforms are also becoming increasingly popular. Two examples of popular enterprise social networking platforms include Jive™ offered by Jive Software (Palo Alto, Calif.) and Yammer™ offered by Yammer, Inc. (San Francisco, Calif.). The same problems discussed above apply equally with respect to these social networking platforms, which—like many hosted email platforms—enforce predetermined limitations on the size of files that may reside within the platform. Yammer, for instance, enforces a 50 MB limitation on file sizes.

The unprecedented level of email and other files generated by modern businesses has also given rise to various archiving solutions. Archiving solutions typically transfer data that is aged or infrequently accessed from a primary storage location to a less expensive secondary storage location. Current archiving solutions face many of the same limitations discussed above with respect to migration operations.

Given the foregoing, businesses continue to need easy-to-implement, enterprise-scale migration and archiving solutions that provide enhanced convenience, data fidelity, security, and suitable alternative options for processing email messages, attachment files or other files that cannot be migrated or archived. Businesses also need migration and archiving solutions that allow them to specify messages or files that they do not want migrated or archived based on various rules or criteria.

SUMMARY

A network-based solution that provides for enhanced management of migration and archiving operations, as embodied in various systems, methods, and non-transitory computer-readable storage media, is disclosed.

In one embodiment, a computer-implemented method for managing migration and archiving operations includes accessing a plurality of mailboxes from a source email platform. Each mailbox includes a plurality of email messages associated with a user. The method includes executing instructions stored in memory of an application server. By way of executing the instructions, the application server performs a pre-transfer assessment on each of the accessed mailboxes. The pre-transfer assessment automatically evaluates each email message contained in each assessed mailbox by applying one or more rules. In the embodiment, performing the pre-transfer assessment includes applying one or more transferability rules to each email message contained in the assessed mailbox. Performing the pre-transfer assessment also includes applying a plurality of exception rules to each email message. After applying the rules, the pre-transfer assessment further includes designating one or more email messages for exclusion from a migration or archiving operation. The designation is based on a result produced by either or both of the transferability rules and the exception rules.

After designating one or more email messages for exclusion, the method includes performing the migration or archiving operation on the assessed mailbox while excluding the designated messages. The migration or archiving operation is not performed on the one or more email messages designated for exclusion. The method may further include providing the user with one or more selectable actions to be performed on the one or more email messages excluded from the migration or archiving operation. After receiving a user selection of one of the one or more actions to be performed on the one or more email messages designated for exclusion, the method includes performing the selected one or more actions.

In another embodiment, a non-transitory computer-readable storage medium stores an executable computer program that, when executed by a processor, performs the foregoing method for managing migration and archiving operations.

In yet another embodiment, a system for managing migration and archiving operations includes an email platform hosted by a computing device, a remote storage device, and application server communicatively coupled to the email platform and the remote storage device by a network. The email platform stores a plurality of mailboxes, each of which contains a plurality of emails. The application server includes instructions stored in memory that, when executed by a processor, cause the application server to access one or more of the mailboxes from the email platform. The application server performs a pre-transfer assessment on each of the accessed mailboxes. In the system, the pre-transfer assessment includes applying one or more transferability rules and one or more exception rules to each email message contained in the assessed mailbox.

The assessment further includes designating one or more email messages of the assessed mailbox for exclusion from a migration or archiving operation based on a result produced by applying either or both of the transferability rules and the exception rules. The application server then performs the migration or archiving operation on the assessed mailbox, but only with respect to email messages not designated for exclusion. Email messages designated for exclusion are not migrated or archived. The application server then provides the user with one or more selectable actions to be performed on the one or more email messages excluded from the migration or archiving operation. After receiving a user selection of one of the one or more actions to be performed on the one or more email messages designated for exclusion, the application server performs the selected one or more actions.

BRIEF DESCRIPTION OF THE FIGURES

FIG. 5 is an illustration of an exemplary email message with a stubbed attachment file.

FIG. 6A is an illustration of an exemplary stub without a visual cue of the content contained in the stubbed attachment file of FIG. 4.

FIG. 6B is an illustration of an exemplary stub with a visual cue of the content contained in the stubbed attachment file of FIG. 4.

DETAILED DESCRIPTION

Figure 1:
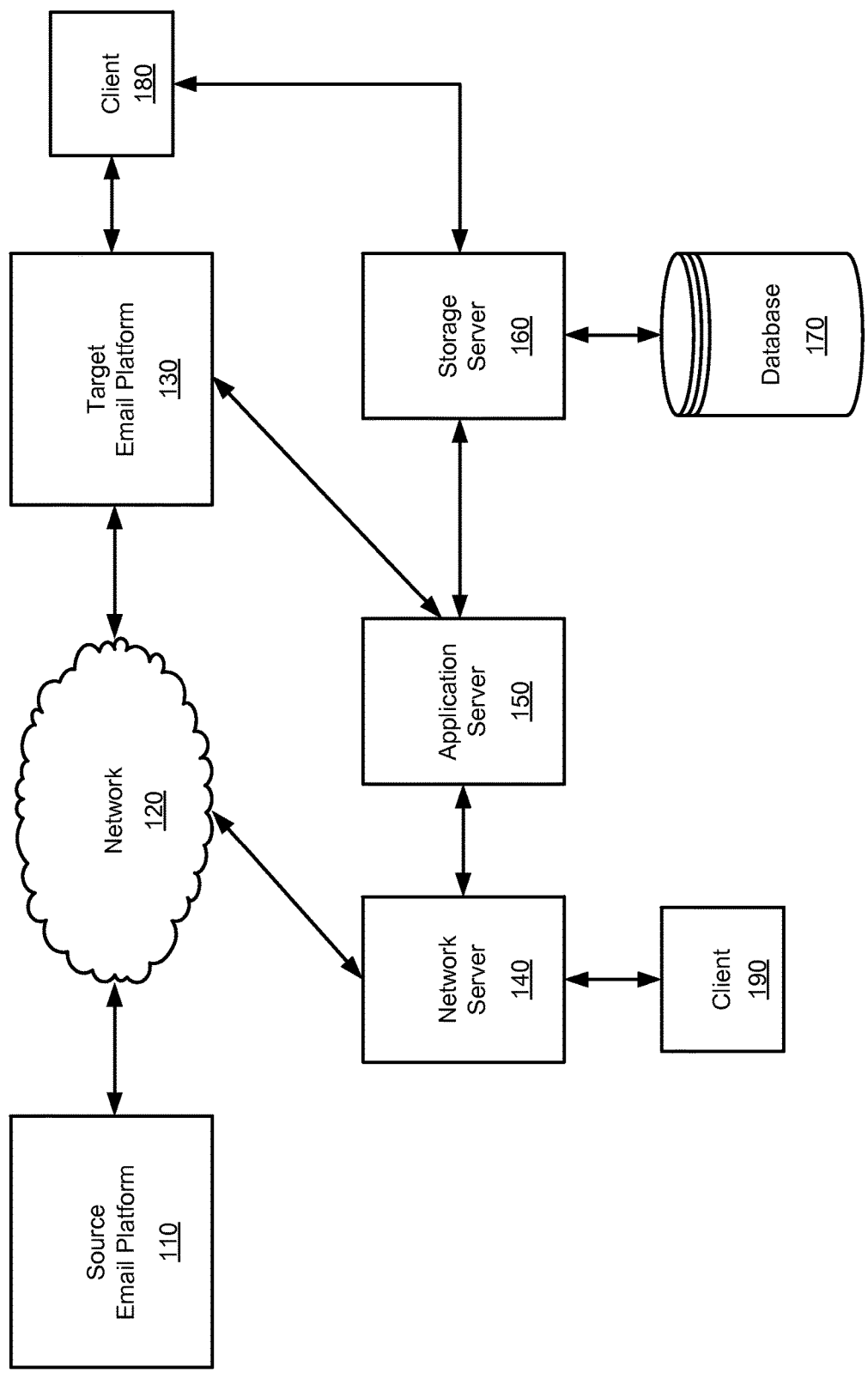
FIG. 1 is a block diagram of an exemplary environment in which a network-based solution that provides for enhanced management of migration and archiving operations may function.

A network-based solution that provides for enhanced management of migration and archiving operations is disclosed. Although the novel solution is illustrated in this disclosure by way of various systems, methods, and non-transitory computer-readable media, it should be understood that the embodiments described herein are exemplary only and are in no way limiting. For instance, although certain portions of the present disclosure discuss migrating emails between email platforms, the described solution applies equally to migrating other files across such platforms, such as calendar items, task or "to do" items, contacts, etc. Moreover, although the figures provided illustrate one exemplary embodiment as applied to migrations between email platforms, the solution also offers the same benefits with respect to migrations between other types of platforms, such as enterprise social networking platforms (e.g., from Jive to Yammer). Similarly, the solution is equally applicable to archiving operations. Thus, any use of migration operations as an illustrative example should not be construed as limited to only those types of operations. Persons of ordinary skill in the art will readily recognize and appreciate that the present disclosure suggests many other possible embodiments in addition to those expressly described herein.

The network-based solution, as may be embodied by various systems, methods, and non-transitory computer-readable storage media, provides an improved solution to managing and overcoming problems that arise during migration and archiving operations. In various embodiments, the solution may involve accessing, by way of a download or a network search, one or more mailboxes from a source email platform and performing a pre-transfer assessment on each of the emails contained in the one or more mailboxes. In some embodiments, the plurality of email messages may be accessed by downloading each of the one or more mailboxes from source email platform 110 (e.g., at an application server, such as application server 150 of FIG. 1). In other embodiments, the plurality of email messages may be accessed without downloading the one or more mailboxes. The email messages may, for instance, instead be accessed by issuing search commands over the network that are then fulfilled by the source email platform (e.g., by employing one or more messaging application programming interfaces (APIs) over the network). Persons of ordinary skill in the art will readily recognize and appreciate that the access methods described herein (e.g., downloading, employing one or more messaging APIs over a network, etc.) are merely illustrative and in no way limiting. Having read the present disclosure, such persons will recognize that there are a variety of other suitable methods through which the plurality of email messages may be accessed and that such methods fall within the scope of the present disclosure. As used in this disclosure, the terms "email, "message," and "email message" are used interchangeably unless otherwise noted.

Performing the pre-transfer assessment may include applying one or more transferability rules to each email message contained in the assessed mailbox. As used in the present disclosure, the term "transferability rule" refers to a rule, criteria, or parameter dictated by a source platform or target platform or device that determines whether a particular email message, attachment file, or other file (e.g., social media user profile) may be successfully transferred from the source platform to the target platform or device during a migration or archiving operation. Performing the pre-transfer assessment may also include applying one or more exception rules to each email message contained in the assessed mailbox. As used in the present disclosure, the term "exception rule" refers to a rule, criteria, or parameter dictated by a business, organization, or association (e.g., by a business's system or network administrator), that determines whether a particular email message, attachment file, or other file may be transferred from the source platform to a target platform or device without violating a desire, understanding, mandate, standard, rule, or policy upheld by the business, organization, or association (e.g., where the user is a system administrator). Together, the transferability rules and the exception rules may constitute a master list of migration exception rules. For purposes of the present disclosure, the terms "business," "company," "association," and "organization" may be used interchangeably and may include any other type of organization that engages in migration or archiving activities (e.g., a university, a government agency, etc.)

The pre-transfer assessment may further include, based on the results obtained from applying either or both of the one or more transferability rules and the one or more exception rules, a step of designating one or more email messages of the assessed mailbox for exclusion from a migration or archiving operation. Designating the one or more email messages for exclusion may include notifying a user (e.g., a business's administrator or a mailbox owner) about the messages designated for exclusion. In many cases, the mailbox owner will have directly sent or received the email message designated for exclusion—or a related attachment file—and, as a result, is best suited for determining which actions, if any, the solution should take on the message or file. In other cases, an administrator may have access to the mailbox and may need to make decisions in lieu of or on behalf of the actual mailbox owner (e.g., in accordance with company policy or in circumstances in which the mailbox owner cannot timely access the system and provide his or her input by selecting actions). Notifying the user may include sending the user an email, text message, mobile push notification, or other suitable message format containing an identification of the email messages designated for exclusion (e.g., a list, table, graphical representation, etc.).

The solution may then involve performing the migration or archiving operation on the assessed mailbox for all email messages other than those designated for exclusion. In such cases, the migration or archiving solution is not performed on the one or more email messages designated for exclusion. In various embodiments, the solution may involve performing the migration or archiving operation before or after addressing and resolving the excluded messages. Persons of ordinary skill in the art will readily recognize and appreciate that the procedural order of preforming the migration or archiving operation before or after addressing any excluded messages may vary depending on the underlying system infrastructure, considerations related to computer resource management, the personal preference of system designers and administrators, and various design considerations.

After one or more emails of the assessed mailbox have been designated for exclusion from the migration or archiving operation, the solution may involve providing a user with one or more selectable actions to be performed on the one or more excluded email messages or their related attachment files. The provision of the selectable actions may, in some embodiments, be akin to an automated user workflow. The solution may involve receiving from the user a selection of one or more actions to be performed on the one or more excluded email messages or their related attachment files. The solution may then involve performing the selected one or more actions on the one or more email messages designated for exclusion or on their related attachment files.

In another embodiment concerning migration from a source enterprise social networking platform to a target enterprise social networking platform, the network-based solution may involve performing the foregoing steps on downloaded user profiles, business unit groups, or other organized compartments of data rather than email messages or related attachment files contained in mailboxes.

In yet a further embodiment, the solution may be implemented to provide for enhancement management of archiving operations. During an archiving operation, the solution may involve accessing, by way of a download, network search, or other suitable access method, mailboxes, email messages, social media files (e.g., user profiles), business unit groups, or other types of data and performing a pre-transfer assessment on the accessed data. The pre-transfer assessment may involve applying one or more transferability rules, one or more exception rules, or both, to the accessed data. In some embodiments, the one or more exception rules may include one or more rules, criteria, or parameters dictated by a business, organization, or association (e.g., by the system or network administrator of an employer for which an employee end-user of a mailbox may work) that determine whether a particular email message, attachment file, or other file may be transferred from the source platform to a target platform or device without violating a desire, understanding, mandate, standard, rule, or policy upheld by the business, organization, or association. In some embodiments, the solution may permit the end-user of a mailbox to supply exception rules. The pre-transfer assessment may further involve analyzing the results obtained from applying the one or more transferability rules and the one or more exception rules. The assessment may involve designating a portion of the data for exclusion from an archiving operation. The solution may then involve performing the archiving operation for all portions of the accessed data other than those designated for exclusion. In such cases, the archiving operation is not performed on the portion of the data designated for exclusion. After the portion of data has been designated for exclusion from the archiving operation, the solution may involve providing a user with one or more selectable actions to be performed on the excluded portion. The solution may involve receiving from the user a selection of one of the one or more actions to be performed on the excluded portion of data. The solution may then involve performing the selected one or more actions on the excluded portion of data.

The network-based solution described herein constitutes a significant advancement in the technical fields of migration and archiving operations, particularly with respect to enterprise-scale migrations between email platforms and other platforms (e.g., social networking platforms) and enterprise-scale archiving operations. As discussed below in further detail, the solution overcomes a persistent problem in the email and file storage industries by providing an automated workflow through which a user (e.g., a mailbox owner, a user profile owner, an administrator, etc.) can manage migration or archiving operations involving data (e.g., email messages, attachment files, etc.) that cannot be successfully migrated due to one or more circumstances dictated by a source platform, a target platform, or a company, organization, or associated to which an end-user of a mailbox belongs (e.g., email message or attachment size limits dictated by a target email platform or secondary storage archive, file type incompatibilities, or exception rules determined by a company that represent the company's file retention policy). The solution overcomes the same issues with respect to other types of platforms, as noted above. The solution not only ensures greater data fidelity during migration and archiving operations, but it also offers data security benefits and is easy to deploy and use. The solution also provides greater flexibility and enhanced options for managing instances in which a portion of data cannot be successfully migrated or archived without intervention or modification. The solution is also suitable for use by multiple employees on an enterprise-level scale.

FIG. 1 is a block diagram of an exemplary environment 100 in which a network-based solution for managing migration and archiving operations may function. Although FIG. 1 is presented in the context of migration between email platforms, in alternative embodiments the network-based solution provides enhanced management of migrations involving other types of platforms, such as enterprise social networking applications. The solution also provides enhanced management of archiving operations (e.g., where a large file is transferred from a primary email server or other primary storage location to a secondary storage location to reduce disk usage and other computing resources consumed at the primary storage location). Accordingly, although certain figures have been presented for the purpose of illustration, they should not be construed as limited to the precise forms disclosed. By way of an example, where FIG. 1 discusses a "source email platform" or "target email platform," it should be understood that the described embodiment is exemplary and that, in other possible embodiments, the structures described could alternatively be a source enterprise social networking platform and target enterprise social networking platform, respectively, or other types of platforms. Similarly, assessed "mailboxes" could, in other embodiments, be user profiles, posts, storage systems, and the like. In embodiments concerning archiving operations, the environment may optionally omit a target platform like that shown in FIG. 1. In such cases, the modified email or other file may be stored back on the primary storage device as opposed to being migrated to a target platform as described within the context of FIG. 1. Persons of ordinary skill in the art will readily recognize and appreciate that the solution described herein may be implemented in a variety of contexts (e.g., migration and archiving solutions) and that the provided description and figures are illustrative and are in no way limiting.

As shown in FIG. 1, one exemplary environment may include a source email platform 110 communicatively coupled to a communications network 120. The source email platform 110 may be communicatively coupled to a target email platform 130 through network 120 and numerous intermediate computing devices, such as a network server 140. Network server 140 may be communicatively coupled to an application server 150. Application server 150 may be coupled to a remove storage device, such as storage server 160. Storage server 160 may host a shared, cloud-based file storage platform such as SharePoint or One Drive for Business. To that end, storage server 160 may include database 170 stored in memory. Alternatively, storage server 160 may be communicatively coupled to one or more separate and distinct database servers (not shown) maintaining database 170 and executable instructions associated with managing the database (e.g., performing lookups and, in some embodiment, generating secure HTML links to data files as discussed below). A client 180 may be communicatively coupled to both target platform 130 and storage server 160. Another client 190 may be communicatively coupled to network server 140 for the purpose of accessing the network-based solution hosted by application server 150. Client 180 may be used by a mailbox owner to access email messages hosted on target email platform 130, while client 190 may be used by a network or system administrator. Some or all of the foregoing devices may function together as a system over network 120.

Source email platform 110 and target email platform 130 may each be a cloud-based or hosted email platforms, some examples of which include Google Apps Gmail™, SunONE/iPlanet™, Novell GroupWise™, Microsoft Exchange 2000/2003/2007/2010™, Microsoft BPOS™, Microsoft Live@Edu™, and Microsoft 36S™. Source platform 110 and target platform 130 may each include one or more computing devices, such as network servers and mail servers, communicatively coupled together to form a self-contained hosted email system. In embodiments concerning archiving operations, target email platform 130 may not be necessary. In some cases, for instance, email messages at source email platform 110 may be modified in one or more ways (e.g. stubbed) and then returned to source email platform 110 in modified form as part of the archiving process.

Network 120 may be implemented as a private network, a public network, an intranet, the Internet, or any suitable combination of the foregoing. Although FIG. 1 illustrates certain computing devices communicatively coupled to network 120 (i.e., source platform 110, target platform 130, and network server 140), persons of ordinary skill in the art will readily recognize and appreciate that all of the devices depicted in FIG. 1 may be communicatively coupled together through network 120 or a series of such networks.

Network server 140 may receive and respond to requests transmitted over network 120 between the various computing devices depicted in FIG. 1 (e.g., between client 190 and application server 150. Although network server 140 is depicted between client 190 and application server 150 in FIG. 1, persons of ordinary skill in the art will appreciate that the environment illustrated in FIG. 1 may in many cases include additional network servers between other computing devices and may implement a network service. In one embodiment, for example, network 120 may be the Internet and network server 140 may be a web server. In various possible embodiments, network server 120 and application server 140 may be incorporated into a single computing device or, alternatively, may function as standalone computing devices as illustrated in FIG. 1.

Application server 150 may communicate with multiple computing devices, including for example network server 140, target email platform 130, storage server 160, and client 190. Application server 150 may host and maintain an executable application in memory. When executed, the application may provide a network-based solution for managing archiving operations involving source email platform 110 and, in the case of migration operations, target email platform 130. As noted above, network server 140 and application server 150 may be incorporated as a single computing device or, alternatively, they may function as standalone computing devices.

Storage server 160 may communicate with application server 150, database 170, and client 180. In some embodiments, storage server 160 may be incorporated into a single computing device with either or both of network server 140 and application server 150. Database 170 may store data, process data, and resolve queries received from storage server 160.

Clients 180 and 190 may each be a computing device, such as a desktop computer, workstation, laptop, smartphone, tablet, or other suitable computing device. Clients 180 and 190 may each be communicatively coupled to network 120 at a network interface and may each be coupled either directly to network 120 or through any number of intermediate network servers, gateways, or other suitable computing devices. Client 180 may include a locally stored client email application and may be associated with a mailbox owner. The mailbox owner may be a standard user of source platform 110 and may be associated with a mailbox being archived or being migrated over network 120 from source platform 110 to target platform 130. Provided the benefit of the network-based solution described herein, client 180 may not only communicate with target platform 130 following migration, but also with storage server 160 as necessary to retrieve or otherwise access email messages or attachments files that were detected, analyzed, and stored at storage server 160 by the application hosted on application server 150.

Client 190 may include a network browser application through which a user—a company's system administrator, for example—may access network-based applications. The network browser may be a locally stored client application such as Chrome™, FireFox™, Safari™, Opera™, or Internet Explorer™. The network browser may permit an administrator to view content provided to client 190 by application server 150. In some embodiments, client 190 may be a mobile device and, rather than viewing content provided to client 190 with a network browser application, administrator may do so through a custom mobile application downloaded and locally installed on client 190. In any event, through a series of graphical user interfaces rendered and displayed at client 190, the administrator may communicate with application server 150 to configure, deploy, and monitor the executable application stored in memory of application server 150. Notably, in some instances, client 180 and 190 may be the same computing device, just as the administrator may be both an administrator and a mailbox owner of source email platform 110.

Figure 2:
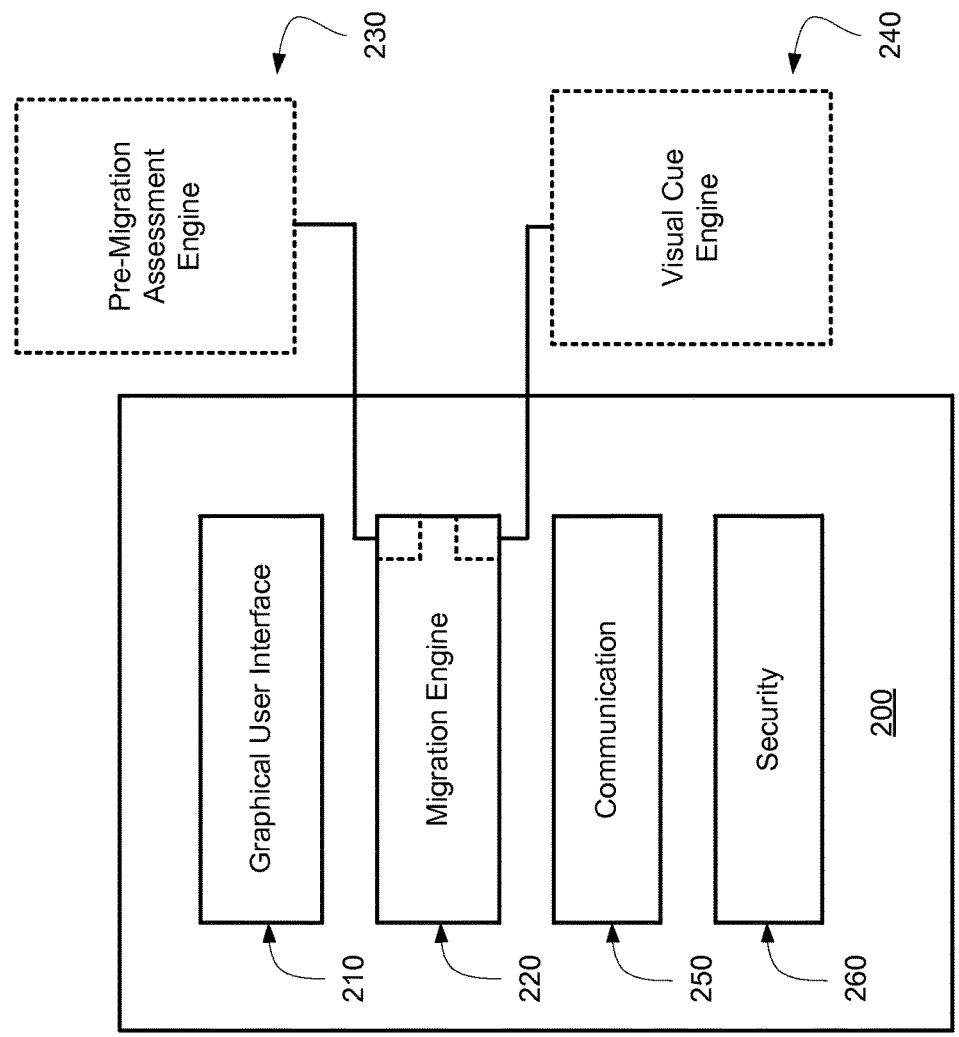
FIG. 2 is a block diagram of an exemplary application.

FIG. 2 is a block diagram of an exemplary application 200 stored in memory of application server 150. Application 200 may include a plurality of objects or modules, each of which may be responsible for effectuating one or more functionalities that contribute to the provision of a network-based solution for managing migration and archiving operations. Each module may include a data model associated with a particular functionality and executable computer instructions that, when executed, effectuate the functionality.

As shown in FIG. 2, application 200 may include a graphical user interface module 210, a migration engine 220 (which may include submodules such as pre-migration assessment engine 230 and visual cue engine 240), a communication module 250, and a security module 260. Graphical user interface module 210 may include executable instructions that, when executed by a processor of application server 150, effectuate functionality concerning the rendering and display of a series of graphical user interfaces on clients 180 and 190. Migration engine 220 may include executable instructions that, when executed by a processor of application server 150, effectuate functionality concerning the pre-transfer assessment of mailboxes accessed at source email platform 110, including the designation of certain email messages for exclusion from a subsequent migration operation. The instructions of migration engine 220 may further be executable to effectuate functionality concerning the migration of non-excluded email messages and the provision of alternative actions for processing excluded messages. The instructions of migration engine 220 may further be executable to effectuate functionality concerning the performance of one or more alternative actions selected by a user for processing excluded messages.

Although FIG. 2 illustrates engine 220 as a migration engine, persons of ordinary skill in the art will readily appreciate that engine 220 may likewise be an archiving engine when the solution is applied within the archiving context. Thus, for purposes of the present disclosure, it should be understood that any references to migration engine may likewise refer to archiving engine 220 within the appropriate embodiment (e.g., within the archiving context).

Migration engine 220 may include, as a sub-module, pre-migration assessment engine 230. Pre-migration assessment engine 230 may include executable instructions that, when executed by a processor of application server 150, effectuate functionality concerning the assessment of mailboxes accessed at source email platform 110, including the designation of certain email messages for exclusion from a subsequent migration operation. The pre-migration assessment may include applying one or more transferability rules and/or one or more exception rules to each email message contained in each assessed mailbox. The one or more exception rules may include one or more rules, criteria, or parameters dictated by a business, organization, or association (e.g., by a business's system or network administrator) that determine whether a particular email message, attachment file, or other file may be transferred from the source platform to a target platform or device without violating a desire, understanding, mandate, standard, rule, or policy upheld by the business, organization, or association. The designation of certain email messages for exclusion from the migration operation may be based on a result produced by applying the one or more transferability rules and/or the one or more exception rules. Pre-migration assessment engine 230 may be a sub-module of migration engine 220, or it may be a separate and distinct module of application 200. Pre-migration assessment engine 230 may also be a separate and distinct application. Pre-migration assessment engine 230 may be stored in and executed by application server 150 of FIG. 1, or it may be stored in and executed by a separate and distinct computing device. Although the exemplary embodiment depicted in FIG. 2 references a "pre-migration assessment engine 230," persons of ordinary skill in the art will readily appreciate that assessment engine 230 may likewise be a pre-archiving assessment engine 230 in the context of embodiments concerning the management of archiving operations. Assessment engine 230 may alternatively be referred to as pre-transfer assessment engine 230 insofar as it applies in some embodiments to the management of both migration and archiving operations.

In connection with migration engine 220 effectuating functionality concerning the performance of one or more actions selected by a user for processing excluded messages, migration engine 220 may process and modify email messages or file attachments. In some cases, the actions may be performed on the designated email attachment as a whole, while in other cases, the actions may be directed only at a related attachment file. Performing the selected one or more actions on the one or more email messages designated for exclusion may include, for instance, modifying an email message by "stubbing" an attachment file of the email message and then performing the migration or archiving operation on the modified email message. In such cases, stubbing the attachment file may include determining a file size of the attachment file, comparing the file size of the attachment file to a predetermined attachment size limit, and uploading a copy of the attachment to a remote storage platform (e.g., storage server 160 of FIG. 1) when the comparison determines that the file size of the attachment file exceeds the predetermined attachment size limit. Stubbing the attachment file may further include removing the attachment file from the email message, and replacing the attachment file with a secure link to the copy of the attachment stored at the remote storage platform.

In some embodiments, replacing the attachment file with a secure link to the copy of the attachment stored at the remote storage platform may include generating a visual cue of the attachment and embedding the generated visual cue into the modified email message. In such embodiments, migration engine 220 may include, as a sub-module, visual cue engine 240. Visual cue engine 240 may include executable instructions that, when executed by a processor of application server 150, effectuate functionality concerning the automatic generation of a visual cue of the stubbed attachment (e.g., an iconic representation, a thumbnail image, or a video clip). Visual cue engine 240 may be a sub-module of migration engine 220, or it may be a separate and distinct module of application 200. Visual cue engine 240 may also be a separate and distinct application. Visual cue engine 240 may be stored in and executed by application server 150 of FIG. 1, or it may be stored in and executed by a separate and distinct computing device.

In the exemplary case of migrating between email platforms, the attachment files may be text documents, spreadsheets, slide decks, videos, images, or any other file type transmittable by email. The solution may also include modifying social media files, business unit group, or other data designated for archiving by replacing the file with a link to the copy of the detected file at a remote storage platform. In doing so, the solution may allow administrators or users to reduce the disk usage and other computing resources consumed at a primary computing device (e.g., a primary email server) by transferring large files to a secondary storage location (e.g., a SharePoint server or a secondary email server). The solution may further involve generating a visual cue of the stubbed file and embedding the visual cue in the modified email or other file that remains on the primary computing device.

Communication module 250 may include executable instructions that, when executed by a processor of application server 150, effectuate functionality concerning communications between application server 150 and other computing devices in the exemplary environment depicted in FIG. 1 (e.g., network server 140, target email platform 130, and storage server 160). Security module 260 may include executable instructions that, when executed by a processor of application server 150, effectuate functionality concerning the generation of scrambled or otherwise secure HTML links that provide users direct access to attachments migrated to storage server 160 as discussed below in further detail.

Persons of ordinary skill in the art will readily recognize that the foregoing modules, including migration engine 220, are exemplary in nature and that application 200 may include any number of other modules depending on the anticipated structure of the environment depicted in FIG. 1. Moreover, although exemplary modules have been illustrated as distinct from another, persons of ordinary skill in the art will appreciate that various modules may alternatively be combined. For instance, the functionalities effectuated by communication module 250 and security module 260 may, in some embodiments, be integrated into migration engine 220.

Figure 3:
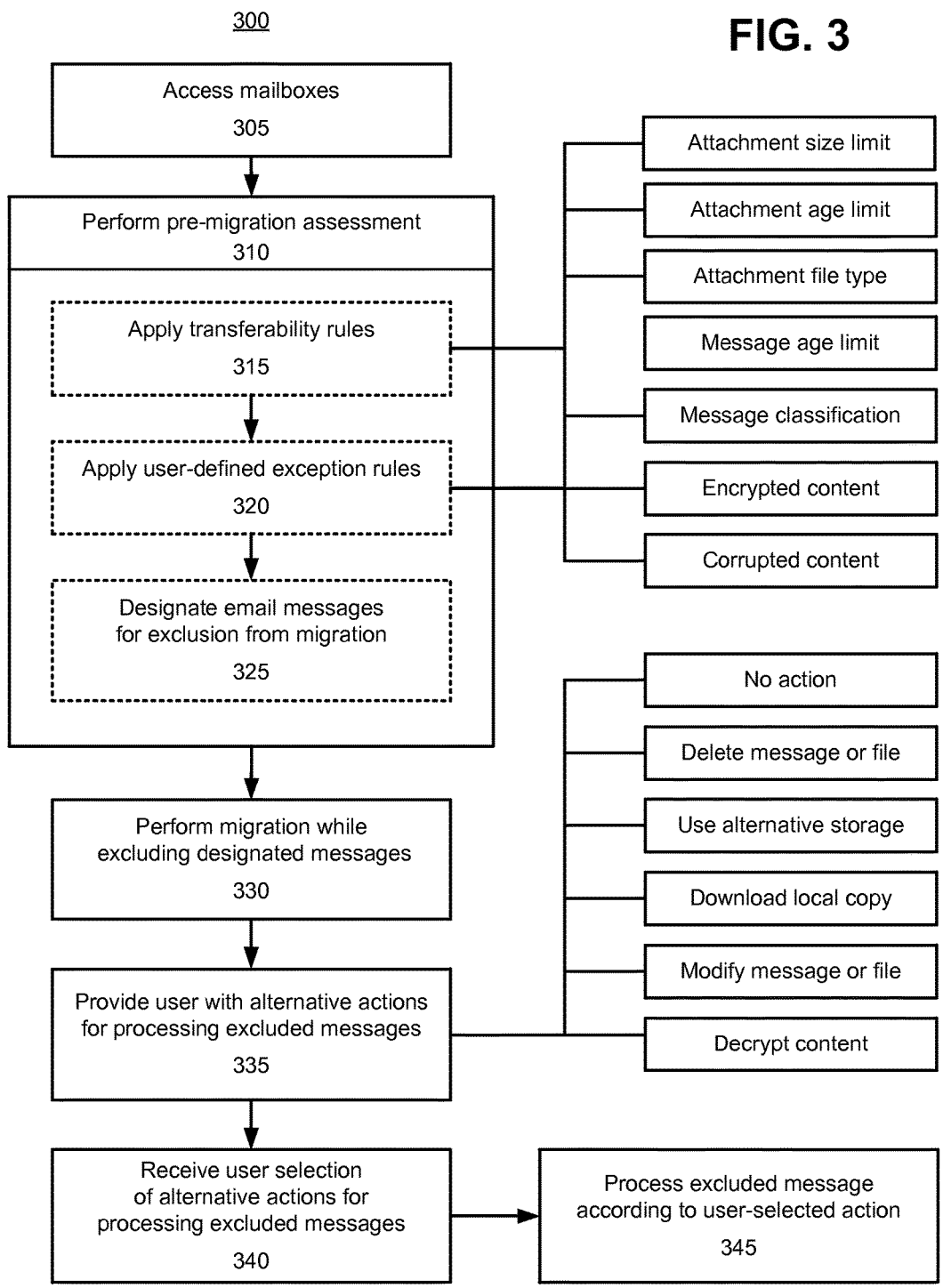
FIG. 3 is a flow diagram of an exemplary computer-implemented method for managing migration and archiving operations.

FIG. 3 is a flow diagram of an exemplary computer-implemented method 300 for managing migration and archiving operations. Computer-implemented method 300 provides system administrators and mailbox owners a more efficient, guided, and flexible avenue for handling email messages, file attachments, or other files that either do not warrant or do not qualify for a migration or archiving operation due to transferability issues (e.g., where an email message, attachment file, or other file cannot be transferred during a migration or archiving operation because it exceeds a predetermined size limit dictated by the target platform) or due to an exception rule (e.g., where a file cannot be transferred during a migration or archiving operation because it is too aged and therefore violates a document retention policy). Method 300, as described below and through its various alternative embodiments, provides a solution to a persistent problem in the migration and archiving fields—two fields inexorably tied to hardware, software, and network-related considerations—and enhances existing migration and archiving technologies.

At block 305, method 300 may include a step of accessing one or more mailboxes stored in a source email platform, such as source email platform 110 of FIG. 1. In some embodiments, the plurality of email messages may be accessed by downloading each of the one or more mailboxes from source email platform 110 (e.g., at an application server, such as application server 150 of FIG. 1). In other embodiments, the plurality of email messages may be accessed without downloading the one or more mailboxes. The email messages may, for instance, instead be accessed by issuing search commands over the network that are then fulfilled by the source email platform (e.g., by employing one or more messaging APIs over the network). Persons of ordinary skill in the art will readily recognize and appreciate that other suitable methods for accessing the one or more mailboxes may alternatively be used. Each mailbox may include a plurality of email messages associated with a user (e.g., a mailbox owner or administrator). Method 300 may include executing instructions stored in memory of application server 150 (e.g., as might be organized into an executable application).

At block 310, by way of executing the instructions, application server 150 may perform a pre-transfer (e.g., pre-migration or pre-archiving) assessment on each of the accessed mailboxes. The pre-transfer assessment may include the application of rules to each email message contained in each assessed mailbox. At block 315, for instance, performing the pre-transfer assessment may include applying one or more transferability rules to each email message contained in the assessed mailbox. Applying one or more transferability rules to each email message of the assessed mailbox may include determining that an email message of the assessed mailbox includes an attachment file that exceeds a predetermined attachment size limit. Determining that the email message of the assessed mailbox includes an attachment file that exceeds the predetermined attachment size limit may include inspecting the mailbox for an email message containing an attachment file, determining a file size of a detected attachment file, and comparing the file size of the detected attachment file to the predetermined attachment size limit. In some cases, the predetermined attachment size limit may be associated with the source email platform or a remote storage device (e.g., where a remote storage device, such as a secondary email server for use during archiving, has an attachment file limit of 25 MB). In other cases, the predetermined attachment size limit may be associated with a target email platform communicatively coupled to the source email platform over a network (e.g., where target email platform 130 of FIG. 1, in the context of a migration operation, enforces an unmodifiable attachment size limit of 25 MB).

Applying one or more transferability rules to each email message of the assessed mailbox may also include determining that an email message of the assessed mailbox includes some other characteristic or parameter that fails to meet a predetermined criterion necessary for the migration or archiving operation to successfully transfer the email message to the target platform or device (e.g., target email platform 130 or storage server 160 of FIG. 1). Other transferability rules may focus on characteristics such as email message or attachment file age, attachment file type (e.g., where file compatibility issues may exist between a source platform and a target platform or between a source platform and a remote storage device), whether or not an email message or attachment contains encrypted or corrupted content, and the like.

At block 320, performing the pre-transfer assessment may include applying a plurality of exception rules to each email message contained in the assessed mailbox. As discussed previously, the one or more exception rules may include one or more rules, criteria, or parameters dictated by a business, organization, or association (e.g., by a business's system or network administrator) that determine whether a particular email message, attachment file, or other file may be transferred from the source platform to a target platform or device without violating a desire, understanding, mandate, standard, rule, or policy upheld by the business, organization, or association. Applying a plurality of exception rules to each email message contained in the assessed mailbox may also include determining that an attachment file of an email message contained in the assessed mailbox exceeds a predetermined attachment size or age limit defined by a user (e.g., greater than 50 MB or greater than two years old). Determining that a size or age of an attachment file exceeds a predetermined size or age limit defined by the user may include inspecting the mailbox for an email message containing an attachment file, determining a size or age of a detected attachment file, and comparing the size or age of the detected attachment file to the predetermined attachment age limit. Determining a size or age of the detected attachment file may include examining metadata associated with the detected attachment file.

Applying a plurality of exception rules to each email message of the assessed mailbox may include determining that an age of an email message of the assessed mailbox exceeds a predetermined age limit defined by a user (e.g., greater than two years old). The user may be a business's system or network administrator. In certain embodiments, the solution may permit a mailbox owner to submit exception rules. Determining that an age of an email message of the assessed mailbox exceeds a predetermined message age limit defined by the user may include determining an age of the email message and then comparing the age of the email message to the predetermined message age limit. Determining an age of the email message may include examining metadata associated with the email message.

Applying a plurality of exception rules to each email message of the assessed mailbox include may further include applying a predetermined retention policy defined by a business, association, or other organization. A company may enforce, for instance, a document retention policy prohibiting certain types of electronic documents or certain type of information from being stored on a remote storage device (e.g., a cloud-based network storage system) during a migration or archiving operations. Applying the predetermined retention policy defined by the business, association, or other organization may include determining a classification associated with the email message and comparing the determined classification with a predetermined classification defined by a business, association, or other organization. Exemplary predetermined classifications for email messages or attachment files may include classifications such as "personal," "internal," "sensitive," "restricted," "financial," "business data," "privileged," "confidential," "trade secret," "attorney work product," "public," "safe to distribute," or the like. Other classifications may focus on the type of email message or the type of underlying data in an email message (e.g., data related to a specialized form or specialized message classification, such as a sales invoice). In some embodiments, method 300 may include retrieving email message or attachment file classifications previously established by a third-party data security software, such as TITUS Classification for Mobile™ produced by TITUS, Inc. (Ottawa, Canada). Applying a predetermined retention policy defined by a business, association, or other organization may also include determining a file type of an attachment file of the email message and comparing the determined file type with a predetermined file type defined by a business, association, or other organization.

At block 325, after applying some or all of the foregoing rules, the pre-transfer assessment may include designating one or more email messages of the assessed mailbox for exclusion from a migration or archiving operation. The designation may be based on at least one of a result of the application of the one or more transferability rules and a result of the application of the one or more exception rules. Designating the one or more email messages for exclusion from the migration or archiving operation may include adding the one or more email messages to an exception list (e.g., a master list of migration exceptions resulting from the application of both the transferability rules and the exception rules).

After designating one or more email messages for exclusion, at block 330 method 300 may include performing the migration or archiving operation on the assessed mailbox. In such cases, the migration or archiving operation is not performed on the one or more email messages designated for exclusion. Performing the migration or archiving operation may occur at block 330 as shown in FIG. 3 for illustrative purposes, it may alternatively occur at other points in method 300 (e.g., at the end of method 300 after the excluded messages have been identified, presented to the user along with options for alternatively processing the excluded messages, and processed in accordance with the user's selections).

At block 335, method 300 may further include providing the user with one or more selectable actions to be performed on the one or more email messages excluded from the migration or archiving operation. Providing the user with one or more selectable actions to be performed on the one or more email messages excluded from the migration or archiving operation may include identifying the one or more email messages by way of a graphical user interface displayed at a computing device associated with the user. The excluded email messages may be displayed, for an example, in a table, list, or graphical representation, or other suitable format for conveying which email messages have been designated for exclusion as a result of either, or both, of the transferability rules and the exception rules. The identification may be transmitted to the user by email, text message, mobile push notification, or any other suitable form of transmission.

After receiving, at block 340, a user selection of one of the one or more actions to be performed on the one or more email messages designated for exclusion, method 300 may include performing the selected one or more actions at block 345. Receiving from the user a selection of one or more actions to be performed on the one or more email messages designated for exclusion may include receiving a selection of a single action to be applied to every email message designated for exclusion. Alternatively, receiving from the user a selection of one or more actions to be performed on the one or more email messages designated for exclusion may include receiving an individual selection to be applied for each email message designated for exclusion.

Performing the selected one or more actions on the one or more email messages designated for exclusion may include a wide variety of actions that facilitate the effective management of the migration or archiving operation despite the presence of emails or other files that do not comport with certain operational requirements or policies. Among those actions, some examples include deleting an email message designated for exclusion or simply taking no action at all. Performing the selected one or more actions on the one or more email messages designated for exclusion may also include utilizing an alternative storage option, such as storing an email message on a remote storage platform (e.g., Microsoft SharePoint or One Drive for Business) rather than migrating it to a target email platform. Performing the selected one or more actions on the one or more email messages designated for exclusion may also include making an attachment file of the email message available as a local download until a predetermined expiration time, modifying the email message by deleting the attachment file when the expiration time arrives, and performing the migration or archiving operation on the modified email message. In such embodiments, method 300 may provide users with an opportunity to at least secure a local copy of any email message or attachment file of interest before it is lost permanently. A user may be particularly inclined to download a local copy where the email message or attachment file contains sensitive content that the user does not want stored in a hosted storage platform.

Performing the selected one or more actions on the one or more email messages designated for exclusion may further include decrypting an encrypted email message and then performing the migration or archiving operation on the decrypted email message. Performing the selected one or more actions on the one or more email messages designated for exclusion may include modifying an email message by deleting an attachment file of the email message and then performing the migration or archiving operation on the modified email message.

Performing the selected one or more actions on the one or more email messages designated for exclusion may include modifying an email message by stubbing an attachment file of the email message and then performing the migration or archiving operation on the modified email message. Stubbing the attachment file may include uploading a copy of the attachment file to a remote storage device, removing the attachment file from the email message, and replacing the attachment file with a secure link to the copy of the attachment stored at the remote storage device.

Figure 4:
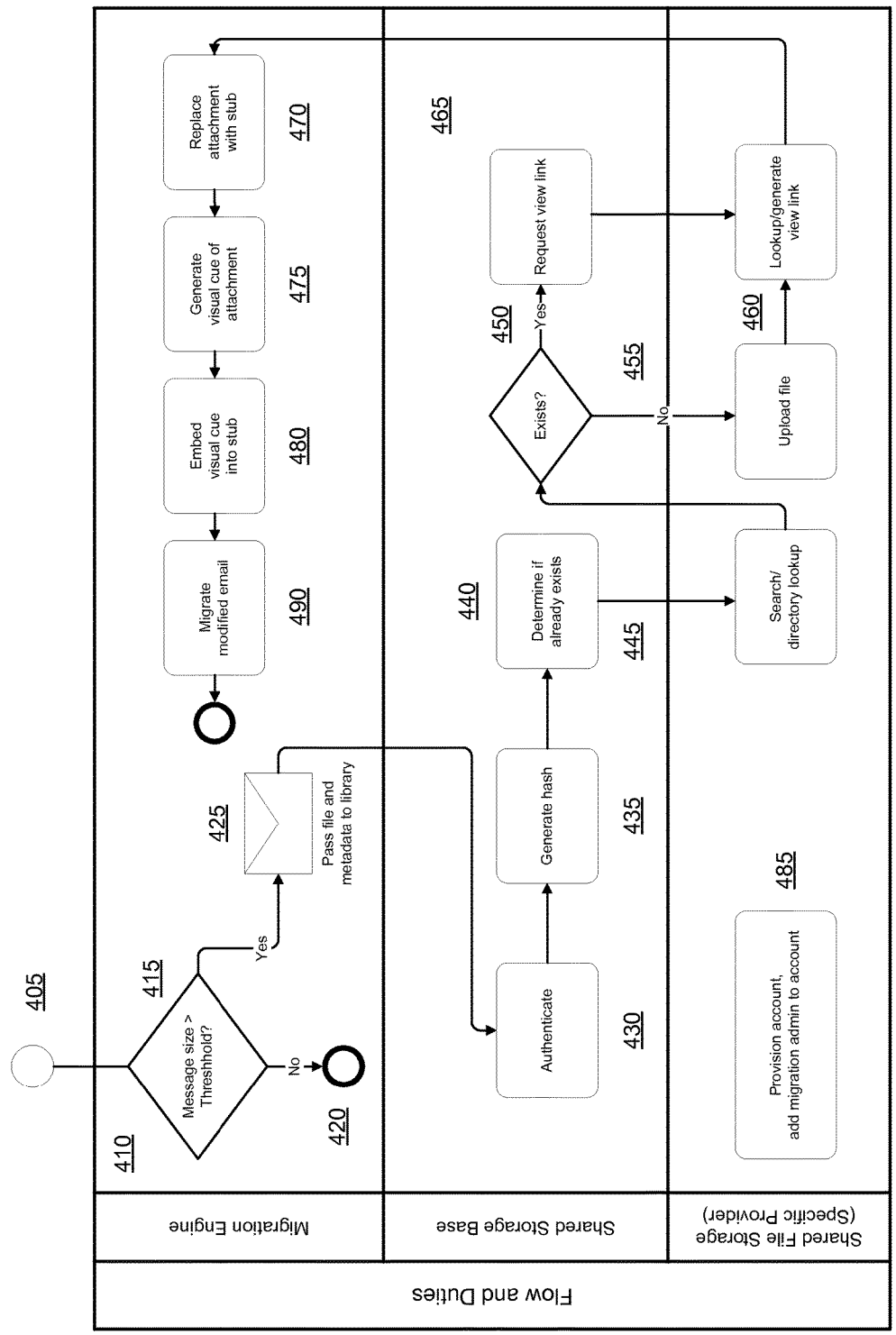
FIG. 4 is a flow diagram of an exemplary computer-implemented method for processing impermissibly large email attachments or other large files during migration and archiving operations.

FIG. 4 is a flow diagram of an exemplary computer-implemented method 400 for processing impermissibly large email attachments or other large files during migration and archiving operations. Exemplary method 400 may be carried out in the context of the environment depicted in FIG. 1 and the exemplary application depicted in FIG. 2. Method 400 may be effectuated as a result of a user selection at block 335 of FIG. 3 in response to being presented with one or more actions for processing an email message or other file designated for exclusion.

In an illustrative scenario, method 300 of FIG. 3 may involve a migration operation intended to migrate an email from source email platform 110 of FIG. 1 to target email platform 130 of FIG. 1. The email at issue may include an attachment file of a size that violates either one or more of the transferability rules applied at block 315 of FIG. 3 or one or more of the exception rules applied at block 320. The email may then be designated for exclusion from the migration operation. The method may involve then presenting the user (e.g., either the mailbox owner or a system administrator) with various alternative options for processing the excluded email message. The alternative actions may include, for example, foregoing any action and allowing the email message to be excluded from the migration operation, deleting the email message from either or both of source email platform 110 and application server 150, using an alternative storage mechanism (e.g., a hosted storage platform), downloading the large attachment file locally to preserve a copy, or modifying the email message or the attachment file. Method 400 illustrates an exemplary instance in which a user has selected to process the prohibited email message by modifying the message to create a stubbed form.

At block 405, application server 150 may receive from client 190 a plurality of information concerning source email platform 110 and target email platform 130. Application server 150 may receive, for instance, an identification of the server type characterizing source platform 110 (e.g., Microsoft Exchange 2010) and target platform 130 (e.g., Office 365). Application server 150 may also receive domain address information, information concerning any applicable consumer keys and secrets (which may be obtained directly from the respective email platforms by the administrator in many cases), server name information, metadata, and a plurality of administrative login credentials for each email platform (e.g., an admin user name and password).

At block 405, application server 150 may also receive an identification of the mailboxes hosted by source email platform 110 that the migration operation being managed by the network-based solution described herein intends to migrate to target email platform 130. Application server 150 may receive the identification in any number of suitable ways, including for example receiving and reading a character-separated values (CSV) file submitted by the administrator at client 190. Alternatively, application server 150 may receive the identification of mailboxes to be migrated through a freeform data entry field presented within a graphical user interface rendered and displayed at client 190.

At block 410, a processor of application server 150 may execute migration engine 220 depicted in application 200 of FIG. 2. Upon execution of migration engine 220, migration engine 220 may use the received administrator login credentials to log into or otherwise access source email platform 110 and access the plurality of mailboxes designated for migration in the identification received at block 405. In some embodiments, migration engine 220 may access the plurality of mailboxes by downloading the mailboxes from source email platform 110, while in other embodiments migration engine 220 may instead access the mailboxes by issuing network search commands over the network that may be fulfilled by source email platform 110 (e.g., by employing one or more messaging APIs over the network).

At block 415, upon receiving each mailbox designated for migration, migration engine 220 may inspect the mailbox for emails containing attachment files as part of a pre-migration assessment. In embodiments in which migration engine 220 includes pre-migration assessment engine 230 as a sub-module as depicted in FIG. 2, the following steps may effectuated by pre-migration assessment engine 220. In the example shown, the pre-migration assessment includes the application of a rule, either a transferability rule (governed by system limitations at target email platform 130, source email platform 110, application server 150, or another intermediate device involved in the migration process) or an exception rule configured by a mailbox owner or system administrator in accordance with personal preference, a company document retention policy, or other considerations. In one embodiment, migration engine 220 may inspect the mailboxes on a rolling basis as the mailboxes are received from source email platform 110. Employing such an embodiment may be advantageous where the volume of mailboxes designated for migration is high (e.g., during enterprise-scale migrations). In other embodiments, migration engine may wait until all of the designated mailboxes have been successfully downloaded or otherwise accessed (e.g., by way of using network search commands over the network that are fulfilled by source email platform 110) before beginning the inspection step.

When migration engine 220 detects an email message with an attachment while inspecting a mailbox, migration engine 220 may determine the file size of the attachment by reading metadata associated with the email. At block 415, migration engine 220 may compare the file size of the attachment to a predetermine threshold for attachment sizes. The predetermined threshold may be governed by the predetermined attachment size limit associated with target email platform 130. In a scenario in which target email platform 130 is Office 365, for instance, the predetermined threshold to which migration engine 220 compares the file size of any attachments detected during the inspection process may be equal to the 50 MB attachment size limit that is prebuilt into Office 365. The predetermined threshold may alternatively be set to a size limit even lower than the actual predetermined attachment size limit of target email platform 130.

As illustrated at block 420, when the comparison of the size of an attachment detected during the inspection process to the predetermined threshold determines that the attachment size does not exceed the threshold, migration engine 220 takes no further action with respect to the attachment. In such cases, the email bearing an acceptably sized attachment is not designated for exclusion and, as a result, is ultimately migrated to target email platform 130 with its attachment left in place.

Conversely, at block 425, when the comparison determines that the attachment size exceeds the predetermined threshold, migration engine 220 may designate the email message for exclusion from the migration process and identify the designated email message to the user. As discussed in the context of FIG. 3, migration engine 220 may present the user with alternative options for processing the email message designated for exclusion. In the illustrative process shown in FIG. 4, the user has selected to overcome the attachment size limit by creating a modified email message that includes a stub file in place of the attachment file. In an alternative embodiment, process 400 may include automatically processing the email message into a modified or "stubbed" email message any time the attachment file size exceeds a predetermined limit specified in either a transferability rule or an exception rule.

When the comparison determines that the attachment size exceeds the predetermined threshold, migration engine 220 may upload or otherwise transmit the attachment to a remote storage device (e.g., storage server 160 of FIG. 1). Storage server 160 may then securely store the attachment in database 170. Migration engine 220 may then replace the attachment with a "stub" file containing a direct link to the secure attachment stored in database 170 (e.g., an HTML link containing a Universal Naming Convention (UNC) path). The stub may be a word processing document (e.g., a Microsoft Word document) or other file type suitable for transmitting a selectable HTML link that directs users to a platform hosted by storage server 160 in which the replaced attachment is securely stored. Where the stub is a word processing document or other text-based document, the stub file may contain helpful explanatory text in addition to the HTML link. For instance, the stub may be include a custom description of why the original attachment was stripped from the migrated email in addition to including the HTML link itself.

As illustrated at blocks 425 through 470, replacing the attachment with a stub may include a plurality of substeps. In some embodiments, replacing the attachment may include steps performed by visual cue engine 240 of FIG. 2. In the exemplary software architecture shown in FIG. 3, visual cue engine 240 is incorporated within the migration engine 220. In other embodiments, however, visual cue engine 240 may be a distinct routine executed by an independent server communicatively coupled to application server 150. As shown at block 430, replacing the attachment with a stub may include authenticating the file. As shown in the exemplary embodiment of FIG. 4, storage server 160—referred to in FIG. 4 as the "shared storage base"—may perform the authentication after receiving the attachment and associated metadata from application server 150.

At block 435, replacing the attachment may further include generating a hash to be associated with the attachment. In some embodiments, like that shown in FIG. 4, storage server 160 may generate the hash and may use the hash to generate a secure view link. A view link may be an anonymous, unidentifiable, or otherwise secure HTML link containing a UNC path that permits a user of client 180 to read the attachment without providing the user with write or edit permissions. Application server 150 then receives the secure view link and uses it to create a stub file as discussed further below. In other embodiments, application server 150 or a separate computing device may directly create the view link. In such cases, application server 150 may execute security module 260. Security module 260 may, upon execution by a processor of application server 150, create a uniquely scrambled or otherwise secure link by applying hash functions, globally unique identifier (GUID) generation algorithms, a combination of the foregoing, or any other suitable encryption mechanisms.

As depicted at block 440, replacing the attachment may further include determining whether the storage server 160 previously received an upload of the attachment from application server 150. Storage server 160 may do so by determining that the attachment already exists in database 170. At block 445, determining whether the attachment already exists in database 170 may include transmitting a lookup request to database 170 and evaluating a received response to the lookup request. In response to receiving the request for a view link from storage server 160, database 170 may perform a lookup to determine whether a view link was previously generated and stored for the attachment at issue. When the determination indicates that the attachment already exists, as shown at block 450, storage server 160 (or, in some embodiments, application server 150) may refrain from uploading the attachment to storage to avoid spending time and computing resources processing duplicative attachments. Instead, storage server 160 may receive a copy of the view link previously generated for the originally uploaded copy of the attachment. Storage server 160 may then transmit the previously generated view link to application server 150.

In some embodiments, database 170 may be incorporated into storage server 160 as illustrated in FIG. 1. In such cases, storage server 160 may include executable instructions associated with database 170 that, when executed, generate the secure view link. In other embodiments, database 170 may be stored in memory of a distinct computing device communicatively coupled to storage server 160, such as a distinct database, and the distinct computing device may execute instructions that generate the secure view link. In some embodiments, for example in those in which database 170 is stored in memory of a computing device distinct from storage server 60, the computing device storing database 170 may transmit the generated view link directly to application server 150. Persons of ordinary skill in the art will readily recognize that the distribution of functionalities and duties depicted in FIGS. 1-4 and described herein are merely exemplary in nature and that the present disclosure suggests a wide variety of other possible distributions.

When the lookup indicates that storage server 160 did not previously generate a view link, as illustrated at block 460, storage server 160 may proceed with generating a new view link and may transmit the view link to migration engine 220 of application server 150. In some embodiments, storage server 160 may also upload the attachment to database 170 (for instance, where database 170 is stored in a distinct computing device as discussed above) as shown at block 455. Depending on the embodiment, storage server 160 may generate the new view link or a separate computing device maintaining database 170 may do so. Upon receiving the view link from storage server 160 at block 465, migration engine 220 may create a stub file, insert the view link into the stub, and replace the attachment with the stub at block 470.

At block 475, migration engine 220 may generate a visual cue of the attachment. In some embodiments, generating the visual cue may include executing a visual cue engine 240 as discussed above. In such cases, the visual cue provides the user of the target email platform with enhanced contextual information regarding the content of the attachment. The additional information assists the user in quickly determining the content of the attachment and evaluating its relevancy and importance. In doing so, the visual cue functionality helps the user avoid the laborious and time-consuming process of opening and examining each attachment by way of its secure view link. Because the user can directly evaluate the content of the attachment within the confines of the stub file, the visual cue functionality also conserves valuable computing resources that would otherwise be expended opening and displaying each attachment file (e.g., those of the user computing device, the target email platform, the hosted storage platform, and any network devices).

In some instances, the visual cue may be an iconic representation of the file type of the detected attachment. Where the detected attachment is a Microsoft Word™ document, for example, the visual cue may be an iconic representation of the logo commonly associated with the Microsoft Word™ application. In other cases, the visual cue may display at least a portion of the content of the detected attachment. In such cases, the visual cue may in effect provide a preview of the content. The visual cue may be a thumbnail image, video clip, or other visual representation of content. Migration engine 220 may generate the visual cue for each attachment by evaluating metadata associated with, and content contained within, the attachment file. Wherein the visual cue for a video attachment is a thumbnail image, for instance, migration engine 220 (or visual cue engine 240 in embodiments in which the two engines are distinct) may automatically generate a thumbnail image from the first frame of the video. Migration engine 220 may use screen capture techniques or may generate the thumbnail image directly using the underlying image data for the frame at issue.

At block 480, migration engine 220 may embed the visual cue into the stub such that the visual cue is visually associated with the secure view link (i.e., the secure link to the remotely stored copy of the attachment). The visual cue may, for example, be embedded adjacent to the link to create an association between the visual cue and the attachment made available through the view link.

Where the visual cue is a thumbnail image, migration engine 220 may embed the visual cue such that a user computing device of the user will display an enlarged or zoomed view of the thumbnail when the user hovers over or selects the thumbnail through a graphical user interface of the user computing device. Where the visual cue is a video clip, migration engine 220 may embed the visual cue such that the user computing device will display an enlarged or zoomed view of the starting frame when the user hovers over or selects the video clip through the graphical user interface. Where the visual cue is a video clip, migration engine 220 may further embed the visual cue such that the user computing device will effectuate playback of the video clip when the user hovers over or selects the video clip through the graphical user interface. Having modified the email, at block 490 migration engine 220 may transmit the modified or "stubbed" email message to target email platform 130 where client 180 may access the email in stubbed form. In embodiments concerning archiving operations, step 490 may include archiving engine 220 transmitting the modified or "stubbed" email or other large file either back to source email platform 110 for continued user access. In such cases, users may not wish to migrate to a new email platform, but rather may wish to continue using source email platform 110 and instead desire to archive aged or infrequently accessed files to reduce disk usage and other computing resources consumed at source email platform 110.

FIG. 5 is an illustration of an exemplary email 500 with a stubbed attachment file. As shown in FIG. 5, email 500 includes a message tab 510 and a stub tab 520. When selected by the user of client 180 accessing target email platform 130 (or source email platform 110 in the context of archiving operations), message tab 510 displays the body of the email message along with a notification that the file formerly attached to the email was stubbed.

FIGS. 6A and 6B respectively illustrate the stub tab 520 of exemplary email 500 of FIG. 5 both with and without an embedded visual cue of the content contained in the stubbed attachment file. When selected, stub tab 520 of FIG. 5 displays the stub with which migration engine 220 (or archiving engine 220 in embodiments concerning archiving operations) replaced the former attachment file. As shown in the exemplary stub 520 of FIG. 6A, stub 520 displays a view link indicating the file name of the remotely stored attachment file. In FIG. 6B, in contrast, stub 520 displays both a view link indicating the file name of the remotely stored attachment file and a visual cue 620 of the content of the attachment file.

In the exemplary context of FIG. 6B, the visual cue is a thumbnail image displaying the title frame of the film "Gone With the Wind." In other examples, visual cue 620 may alternatively display a frame other than the first frame or title frame, such as a highly recognized scene from the film. Visual cue 620 may also be a video clip of the film that may play for the user. The video clip may play immediately when the stub tab is selected, or it may only play when the user, by way of the graphical user interface, hovers over or selects visual cue 620 with a cursor (or finger, stylus, or other selection tool, in the case of a touchscreen device).

By providing visual cue 620 as shown in FIG. 6B, the network-based solution described herein enhances the user's ability to efficiently analyze the content of attachments that have been remotely stored or "stubbed" during the migration or archiving operation.

When migration engine 220 receives a previously generated view link from storage server 160 in response to a lookup performed at database 170, it may create the stub, insert the previously generated view link into the stub, embed the visual cue into the stub, and replace the attachment with the stub as described above.

In some instances, in lieu of a view link that effectively directs the user of client 180 to a read-only version of the attachment removed from the email and stored in storage server 160, migration engine 220 may insert a link to a version of the attachment that permits full read and write privileges. The view link method, however, provides an added layer of security by ensuring that migrated or archived email attachments retain their association with the original document rather than becoming associated with an edited version that may not accurately reflect what was migrated. In embodiments utilizing view links, the network-based solution for processing large attachments or other large files during migration and archiving operations may offer even greater data fidelity.

Referring back to FIG. 4, at block 485, storage server 160 may provision a new user account within the shared storage platform hosted by storage server 160 (or by a distinct computing device storing database 170, where applicable) for the user of client 180. As a result, the user of client 180 may appropriately access the attachment preserved in the shared storage platform of storage server 160. To ensure that the administrator at client 190 may appropriately manage the migration or archiving operation, storage server 160 may add the administrator to the new account. Where storage server 160 determines that the user of client 180 is already associated with a registered account for the shared storage platform, storage server 160 may simply grant the existing account access to any uploaded attachments originating from emails within a migrated or archived mailbox associated with that particular user.

Following the above process, migration engine 220 may complete the migration process for the email message at issue by transmitting the stubbed email message to client 180 by way of target email platform 130 (or back to source email platform 110 in the case of some embodiments concerning archiving operations). The user of client 180 may then access the stubbed email via client 180. In accessing the stubbed email via client 180, the user may view the visual cue embedded in the stubbed email to determine the relevancy or importance of any attachment that migration engine 220 replaced with a stub. Upon selecting the secure view link contained in the attached stub (and reading any accompanying explanatory text), the user may be directed to the original attachment as preserved within the shared storage platform hosted by storage server 160, which as illustrated in FIG. 1 may include database 170. In some embodiments, the visual cue may itself serve as the selectable view link. In such cases, the user may simply select the visual cue to access the remotely stored attachment.

In some embodiments, application server 150 may upload to storage server 160 a separate copy of the attachment for each recipient in an address list of a migrated email. In other embodiments, application server 150 may upload a single copy of the attachment to hosted server 160. In such cases, application server 150, storage server 160, or a combination of the foregoing may actively manage ownership and rights information so as to provide each recipient in the address list of the migrated or archived email appropriate access to the single attachment file.

As is clear from the above description, a network-based solution for managing migration and arching operations—including a method for automatically processing impermissibly large email attachments or other large files—has been disclosed. The foregoing methods may be performed by an executable computer program (e.g. application 200 of FIG. 2) embodied on a non-transitory computer-readable storage medium.

Figure 7:
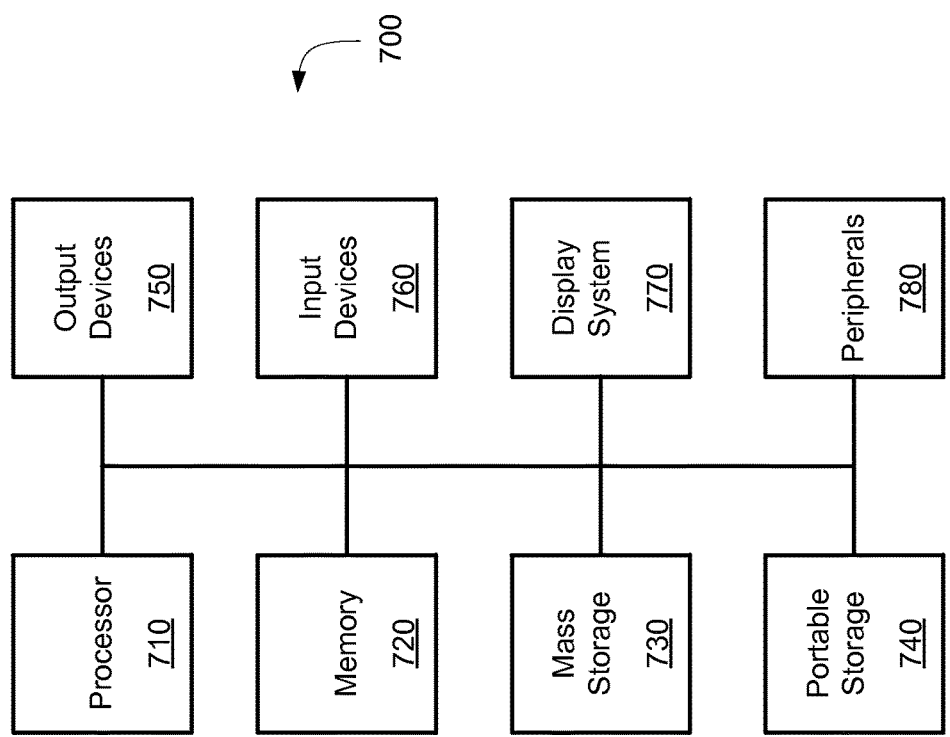
FIG. 7 is a block diagram of an exemplary system for implementing a computing device.

FIG. 7 is a block diagram of an exemplary system for implementing a computing device. The system 700 of FIG. 7 may be implemented in the context of clients 180 and 190, communication network 120, network server 140, application server 150, storage server 160, and database 170 of FIG. 1. The computing system of FIG. 7 may include one or more processors 710 and memory 720. Main memory 720 may store, in part, instructions and data for execution by processor 710. Main memory 720 may store the executable code when in operation. Computing system 700 may further include a mass storage device 730, a portable storage medium drive 740, output devices 750, user input devices 760, a graphics display system 770, and peripheral devices 780.

The components shown in FIG. 7 are depicted as being connected via a single bus 790. The components may alternatively be connected through one or more data transport means. Processor 710 and main memory 720, for example, may be connected via a local microprocessor bus. Mass storage device 730, peripheral device(s) 780, portable storage device 740, and display system 770 may be connected via one or more input/output buses.

Mass storage device 730, which may be implemented with a magnetic disk drive or an optical disk drive, may be a non-volatile storage device for storing data and instructions for use by processor 710. Mass storage device 730 may store system software for implementing embodiments of the network-based solution described herein for purposes of loading the software into main memory 720.

Portable storage device 740 may operate in conjunction with a portable non-volatile storage medium, such as a compact disk or digital video disc, to input and output data and code to and from computer system 700. The system software for implementing embodiments of the present network-based solution may be stored on such a portable medium and input to computer system 700 via portable storage device 740.

Input devices 760 may provide a portion of a user interface. Input devices 760 may include an alpha-numeric keypad, such as a keyboard, touch screen, or touchpad, for inputting alpha-numeric and other information, or a pointing device, such as a mouse, a trackball, stylus, or cursor direction keys. Additionally, system 700 may include output devices 750, such as speakers, printers, network interfaces, monitors, and the like.

Display system 770 may include a liquid crystal display or other suitable display device. Display system 770 may receive textual and graphical information and may process the information for output to the display device.

Peripherals 780 may include any type of computer support device to add additional functionality to computer system 700. Peripheral device 780 could be, for example, a modem or a router.

The components illustrated in computer system 700 of FIG. 7 are those typically found in computer systems that may be suitable for use with embodiments of the present network-based solution. The depiction of such components is not intended to be exhaustive in nature, but is rather intended to represent a broad category of computer components that are well known in the art. Thus, system 700 may be a desktop computer, workstation, server, mainframe computer, laptop, tablet, smartphone or other mobile or hand-held computing device, or any other suitable computing device. Computer system 700 may also include various bus configurations, networked platforms, multi-processor platforms, etc. Various operating systems may be used, such as Unix, Linux, Windows, Macintosh OS, Palm OS, and other suitable operating systems.

The network-based solution described herein constitutes a novel, substantial, and meaningful improvement to the technical processes of automated email migration between hosted email platforms and automated archiving operations. By automatically detecting email messages, attachment files, and other files that violate transferability rules (e.g., having an impermissibly large file size) and/or exception rules (e.g., containing information classified as confidential) and automatically providing users with suitable alternative processing options, the solution overcomes many of the failures plaguing migration and archiving operations today. By automatically inspecting every mailbox (or a designated subset of mailboxes) in a source platform and not only excluding but addressing and resolving potential errors during migration and archiving operations, the solution provides feasible and practical utility for platforms with high volumes of users, including those used on enterprise-level scales. The solution also significantly enhances data fidelity and permits users to quickly identify and preserve email messages, attachment files, or other files that would have otherwise been unknowingly lost during a conventional migration or archiving process.

Moreover, by utilizing a word processing document format for the stub file, the solution permits an administrator to include explanatory text along with the link to the hosted file (e.g., a helpful introduction to the shared file storage platform hosted by the storage server). In doing so, the solution helps to avoid confusion that might otherwise be experienced by the email user upon opening a migrated or archived email and discovering that an attachment is no longer present. The solution also provides enhanced security benefits by providing uniquely scrambled or otherwise secured links that cannot simply be guessed by trial and error or otherwise identified.

Embedding a visual cue of the content of any remotely stored and stubbed attachment files provides the user with even greater enhanced contextual information concerning the attachment. The additional context assists the user in quickly determining the content of the attachment and evaluating its relevancy and importance. By extension, the visual cue functionality helps the user avoid the laborious and time-consuming process of opening and examining each attachment by way of its secure view link. Because the user can directly evaluate the content of the attachment within the confines of the stub file, the visual cue functionality also conserves valuable computing resources that would otherwise be expended opening and displaying each attachment file.

As noted above, although the foregoing description discusses migration between email platforms at length, in other embodiments the network-based solution provides for enhanced management of migrations between other types of platforms, such as enterprise social networking platforms (e.g., from Jive to Yammer). The solution further provides the same functionality within the context of archiving operations. All of the benefits over the prior art provided by the solution and described above are equally applicable to such alternative embodiments. The foregoing detailed description has been presented for purposes of illustration and description. It is not intended to be exhaustive or to limit the technology to the precise form disclosed (e.g., only as applied to migrations between email platforms or other platforms, such as enterprise social networking platforms, or only as applied to archiving operations). Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A computer-implemented method, comprising:
   accessing a mailbox from a source email platform, the mailbox including a plurality of email messages associated with a user; and
   performing a pre-transfer assessment on the mailbox, wherein the pre-transfer assessment includes:
      applying one or more transferability rules to a first email message in the mailbox,
      applying one or more exception rules to the first email message in the mailbox, and
      designating the first email message in the mailbox for exclusion from a migration or archiving operation based on at least one of:
         a result of an application of the one or more transferability rules, and
         a result of the application of the one or more exception rules,
   performing the migration or archiving operation on the mailbox, wherein the migration or archiving operation is not performed on the first email message designated for exclusion;
   sending, to a user device, one or more selectable actions to be performed on the first email message excluded from the migration or archiving operation;
   receiving, from the user device, a selection of at least one of the one or more actions to be performed on the first email message designated for exclusion; and
   performing the selected at least one or more actions on the first email message designated for exclusion.

2. The method of claim 1, wherein applying the one or more transferability rules to the first email message of the assessed mailbox includes determining that the first email message of the assessed mailbox includes an attachment file that exceeds a predetermined attachment size limit.

3. The method of claim 2, wherein determining that the first email message of the assessed mailbox includes an attachment file that exceeds the predetermined attachment size limit includes:
   inspecting the mailbox for the first email message containing an attachment file,
   determining a file size of a detected attachment file, and
   comparing the file size of the detected attachment file to the predetermined attachment size limit.

4. The method of claim 1, wherein applying the one or more exception rules to each email message of the assessed mailbox includes determining that an age of an email message of the assessed mailbox exceeds a predetermined age limit.

5. The method of claim 1, wherein applying one or more exception rules to each email message contained in the assessed mailbox includes determining that an attachment file of an email message contained in the assessed mailbox exceeds a predetermined attachment age limit defined by a user:
   inspecting the mailbox for the first email message containing an attachment file,
   determining an age of a detected attachment file, and
   comparing the age of the detected attachment file to the predetermined attachment age limit.

6. The method of claim 1, wherein applying one or more exception rules to each email message of the assessed mailbox includes applying a predetermined retention policy defined by a user, wherein applying a predetermined retention policy defined by a user includes at least one of:
   comparing a classification associated with the email message to a predetermined classification defined by a user, wherein the classification includes at least one of personal information, business information, and confidential information; and
   comparing a file type associated with the email message to a predetermined file type defined by a user.

7. The method of claim 1, wherein performing the selected at least one or more actions on the first email message designated for exclusion includes at least one of:
deleting the first email message;
storing the first email message on a remote storage device;
decrypting an encrypted email message and then performing the migration or archiving operation on the decrypted email message;
modifying the first email message by deleting an attachment file of the first email message and then performing the migration or archiving operation on the modified first email message; and
modifying the first email message by stubbing an attachment file of the first email message and then performing the migration or archiving operation on the modified first email message.

8. The method of claim 1, wherein performing the selected one or more actions on the first email message designated for exclusion includes:
making an attachment file of the first email message available for download until a predetermined expiration time,
modifying the first email message by deleting the attachment file when the expiration time arrives, and
performing the migration or archiving operation on the modified first email message.

9. A non-transitory computer-readable storage medium having embodied thereon a computer program executable by a processor to cause a system to perform operations comprising:
accessing a mailbox from a source email platform, the mailbox including a plurality of email messages associated with a user; and
performing a pre-transfer assessment on the mailbox, wherein the pre-transfer assessment includes:
applying one or more transferability rules to a first email message contained in the assessed mailbox,
applying one or more exception rules to the first email message contained in the assessed mailbox, and
designating the first email message in mailbox for exclusion from a migration or archiving operation based on at least one of:
a result of the application of the one or more transferability rules, and
a result of the application of the one or more exception rules,
performing the migration or archiving operation on the mailbox, wherein the migration or archiving operation is not performed on the first email message designated for exclusion;
sending, to a user device, one or more selectable actions to be performed on the first email message excluded from the migration or archiving operation;
receiving from the user a device, a selection of at least one of the one or more actions to be performed on the first email message designated for exclusion; and
performing the selected at least one or more actions on the first email message designated for exclusion.

10. The non-transitory computer-readable storage medium of claim 9, wherein applying the one or more transferability rules to the first email message of the assessed mailbox includes determining that the first email message of the assessed mailbox includes an attachment file that exceeds a predetermined attachment size limit.

11. The non-transitory computer-readable storage medium of claim 10, wherein determining that the first email message of the assessed mailbox includes an attachment file that exceeds the predetermined attachment size limit includes:
inspecting the mailbox for the first email message containing an attachment file,
determining a file size of a detected attachment file, and
comparing the file size of the detected attachment file to the predetermined attachment size limit.

12. The non-transitory computer-readable storage medium of claim 9, wherein applying the one or more exception rules to each email message of the assessed mailbox includes determining that an age of an email message of the assessed mailbox exceeds a predetermined age limit.

13. The non-transitory computer-readable storage medium of claim 9, wherein applying one or more exception rules to each email message contained in the assessed mailbox includes determining that an attachment file of an email message contained in the assessed mailbox exceeds a predetermined attachment age limit defined by a user by:
inspecting the mailbox for the first email message containing an attachment file,
determining an age of a detected attachment file, and
comparing the age of the detected attachment file to the predetermined attachment age limit.

14. The non-transitory computer-readable storage medium of claim 13, wherein applying one or more exception rules to each email message of the assessed mailbox includes applying a predetermined retention policy defined by a user, wherein applying a predetermined retention policy defined by a user includes at least one of:
comparing a classification associated with the email message to a predetermined classification defined by a user, wherein the classification includes at least one of personal information, business information, and confidential information; and
comparing a file type associated with the email message to a predetermined file type defined by a user.

15. A system, comprising:
a memory; and
one or more processors operatively coupled to the memory, the one or more processors being configured to execute operations, comprising:
access a mailbox from a source email platform, the mailbox including a plurality of email messages associated with a user; and
perform a pre-transfer assessment on the mailbox, wherein the pre-transfer assessment includes:
apply one or more transferability rules to a first email message in the mailbox,
apply one or more exception rules to the first email message in the mailbox, and
designate the first email message in the mailbox for exclusion from a migration or archiving operation based on at least one of:
a result of the application of the one or more transferability rules, and
a result of the application of the one or more exception rules,
perform the migration or archiving operation on the mailbox, wherein the migration or archiving operation is not performed on the first email message designated for exclusion;
send, to a user device, one or more selectable actions to be performed on the first email message excluded from the migration or archiving operation;

receive, from the user device, a selection of at least one of the one or more actions to be performed on the first email message designated for exclusion; and perform the selected at least one or more actions on the first email message designated for exclusion.

16. The system of claim 15, wherein applying the one or more transferability rules to the first email message of the assessed mailbox includes determining that the first email message of the assessed mailbox includes an attachment file that exceeds a predetermined attachment size limit.

17. The system of claim 16, wherein determining that the first email message of the assessed mailbox includes an attachment file that exceeds the predetermined attachment size limit includes:

inspecting the mailbox for the first email message containing an attachment file, determining a file size of a detected attachment file, and comparing the file size of the detected attachment file to the predetermined attachment size limit.

18. The system of claim 15, wherein applying the one or more exception rules to each email message of the assessed mailbox includes determining that an age of an email message of the assessed mailbox exceeds a predetermined age limit.

19. The system of claim 15, wherein applying one or more exception rules to each email message contained in the assessed mailbox includes determining that an attachment file of an email message contained in the assessed mailbox exceeds a predetermined attachment age limit defined by a user by:

inspecting the mailbox for the first email message containing an attachment file, determining an age of a detected attachment file, and comparing the age of the detected attachment file to the predetermined attachment age limit.

20. The system of claim 19, wherein applying one or more exception rules to each email message of the assessed mailbox includes applying a predetermined retention policy defined by a user, wherein applying a predetermined retention policy defined by a user includes at least one of:

comparing a classification associated with the email message to a predetermined classification defined by a user, wherein the classification includes at least one of personal information, business information, and confidential information; and comparing a file type associated with the email message to a predetermined file type defined by a user.

* * * * *